US012773752B2

(12) United States Patent
Legler et al.

(10) Patent No.: US 12,773,752 B2
(45) Date of Patent: Oct. 27, 2026

(54) METHOD AND APPARATUS FOR ABLATING HOLES IN AN ARTICLE

(71) Applicant: GENERAL ELECTRIC COMPANY, Schenectady, NY (US)

(72) Inventors: Holger Benjamin Legler, Hausen (CH); Stanley Frank Simpson, Greenville, SC (US); Matthias Hoebel, Windisch (CH); Jonathan Lomas, Simpsonville, SC (US)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 696 days.

(21) Appl. No.: 18/201,505

(22) Filed: May 24, 2023

(65) Prior Publication Data

US 2024/0391029 A1 Nov. 28, 2024

(51) Int. Cl.

*B23K 26/382* (2014.01)
*B23K 26/0622* (2014.01)
*B23K 26/08* (2014.01)

(52) U.S. Cl.

CPC ........ *B23K 26/382* (2015.10); *B23K 26/0624* (2015.10); *B23K 26/083* (2013.01); *B23K 26/0869* (2013.01)

(58) Field of Classification Search

CPC ................ B23K 26/382; B23K 26/389; B23K 26/0624; B23K 26/083; B23K 26/0869; B23K 2101/001; B23K 2101/34

See application file for complete search history.

(56) References Cited

U.S. PATENT DOCUMENTS

| | | | | |
|---|---|---|---|---|
| 6,346,687 | B1 * | 2/2002 | Kinoshita | B23K 26/08 219/121.61 |
| 6,720,519 | B2 | 4/2004 | Liu et al. | |
| 6,809,291 | B1 * | 10/2004 | Neil | B23K 26/0624 219/121.76 |
| 2004/0134897 | A1 * | 7/2004 | Das | B23K 26/382 219/121.71 |
| 2006/0169677 | A1 * | 8/2006 | Deshi | B23K 26/382 219/121.7 |
| 2010/0282721 | A1 | 11/2010 | Bunker et al. | |
| 2015/0209899 | A1 * | 7/2015 | Hu | B23K 26/389 219/121.71 |
| 2019/0001442 | A1 | 1/2019 | Unrath et al. | |

OTHER PUBLICATIONS

Extended European Search Report dated Oct. 25, 2024 for corresponding Application No. 2411731389.9.

(Continued)

*Primary Examiner* — Nathaniel E Wiehe
*Assistant Examiner* — Jackson N Gillenwaters
(74) *Attorney, Agent, or Firm* — Grogan, Tuccillo & Vanderleeden, LLP

(57) ABSTRACT

A method of ablating one or more holes in an article with a laser is provided. The method includes an establishing step that establishes an ablation characteristic. The ablation characteristic includes a synchronized machine motion characteristic. An ablating step ablates the one or more holes with the laser based on the synchronized machine motion characteristic. The synchronized machine motion characteristic synchronizes a laser beam emitted from the laser with a location of the one or more holes.

20 Claims, 8 Drawing Sheets

(56) References Cited

OTHER PUBLICATIONS

Stephen et al., "High speed laser micro drilling for aerospace applications", New Production Technologies in Aerospace Industry—5th Machining Innovations Conference (MIC 2014), p. 130-133, https://www.researchgate.net/figure/Cross-section-of-laser-drilled-holes-in-Ti_fig4_268693309.
Waurzyniak, "Lasers Drill Precision Holes Quickly", Nov. 1, 2013, https://www.sme.org/technologies/articles/2013/november/lasers-drill-precision-holes-quickly/.

* cited by examiner

METHOD AND APPARATUS FOR ABLATING HOLES IN AN ARTICLE

BACKGROUND

Technical Field

Embodiments of this disclosure relate generally to gas turbines, and more specifically, to a method and apparatus that ablates or clears holes in an article of a gas turbine assembly.

DISCUSSION OF ART

Rotary machines such as gas turbines contain numerous parts that must be resurfaced and/or coated as part of fabrication and/or maintenance. Resurfacing and coating these parts often results in situations in which holes or apertures within the part are covered or otherwise obstructed by the coating. The holes often provide cooling to the article or other parts of the rotary machine. As a result, the holes must be cleared of all debris in the form of any leftover or excess coating.

Generally, computer-controlled cutting devices (e.g., lasers) are configured to clear debris from the numerous holes. However, this process is difficult and time consuming when numerous holes must be cleared on a variety of complex, contoured surfaces of the part, requiring movement and reorientation of the laser for each hole.

Because of the often large number of cooling holes on a gas turbine part that must be cleared after a coating operation, it becomes important that the hole clearing operation be performed in as efficient a means as possible in order to minimize process time and maximize part throughput. The physical movement of either the cutting devices or the part itself, in preparation for the next process step, often increases the overall process inefficiency as the cutting device typically does not operate during this portion of the process.

As a result, there exists a need for an apparatus and a method of cleaning debris and obstructions from numerous holes of a part that does not require substantial time and effort and does not negatively impact the part or coating thereon.

BRIEF DESCRIPTION

The following presents a simplified summary of the disclosed subject matter in order to provide a basic understanding of some aspects of the various embodiments described herein. This summary is not an extensive overview of the various embodiments. It is not intended to exclusively identify key features or essential features of the claimed subject matter set forth in the Claims, nor is it intended as an aid in determining the scope of the claimed subject matter. Its sole purpose is to present some concepts of the disclosure in a streamlined form as a prelude to the more detailed description that is presented later.

In accordance with one embodiment, a method of ablating one or more holes in an article with a laser is provided. The method includes an establishing step that establishes an ablation characteristic. The ablation characteristic includes a synchronized machine motion characteristic. An ablating step ablates the one or more holes with the laser based on the synchronized machine motion characteristic. The synchronized machine motion characteristic synchronizes a laser beam emitted from the laser with a location of the one or more holes.

In accordance with another embodiment, a system for ablating one or more holes in an article with a laser is provided. The system comprises a memory storing a set of machine motion synchronization data, and at least one processor executing instructions that cause the at least one processor to perform a plurality of steps. An establishing step establishes an ablation characteristic. The ablation characteristic includes a synchronized machine motion characteristic. An ablating step ablates the one or more holes with the laser based on the synchronized machine motion characteristic. The synchronized machine motion characteristic synchronizes a laser beam emitted from the laser with a location of the one or more holes.

In accordance with an alternate embodiment, a non-transitory, computer-readable medium stores instructions that, when executed by at least one processor, causes the at least one processor to perform a plurality of steps. An establishing step establishes an ablation characteristic, and the ablation characteristic includes a synchronized machine motion characteristic. An ablating step ablates one or more holes with a laser based on the synchronized machine motion characteristic. The synchronized machine motion characteristic synchronizes a laser beam emitted from the laser with a location of the one or more holes.

DRAWINGS

The present invention will be better understood from reading the following description of non-limiting embodiments, with reference to the attached drawings, wherein below:

DETAILED DESCRIPTION

Example embodiments of the present method and system will be described more fully hereinafter with reference to the accompanying drawings, in which some, but not all embodiments are shown. Indeed, the present method and system may be embodied in many different forms and should not be construed as limited to the embodiments set forth herein; rather, these embodiments are provided so that this disclosure will satisfy applicable legal requirements. Like numbers may refer to like elements throughout.

The term "ablate" or "ablation" as used herein, refers to the removal of material. This is accomplished by removing the material with a tool or cutting device. The method and system disclosed herein discuss the removal of material from a series of holes with a cutting device that emits laser pulses. The method and system disclosed herein can be applied to other methods involving ablation of material from edges, surfaces, and/or holes.

Figure 1:
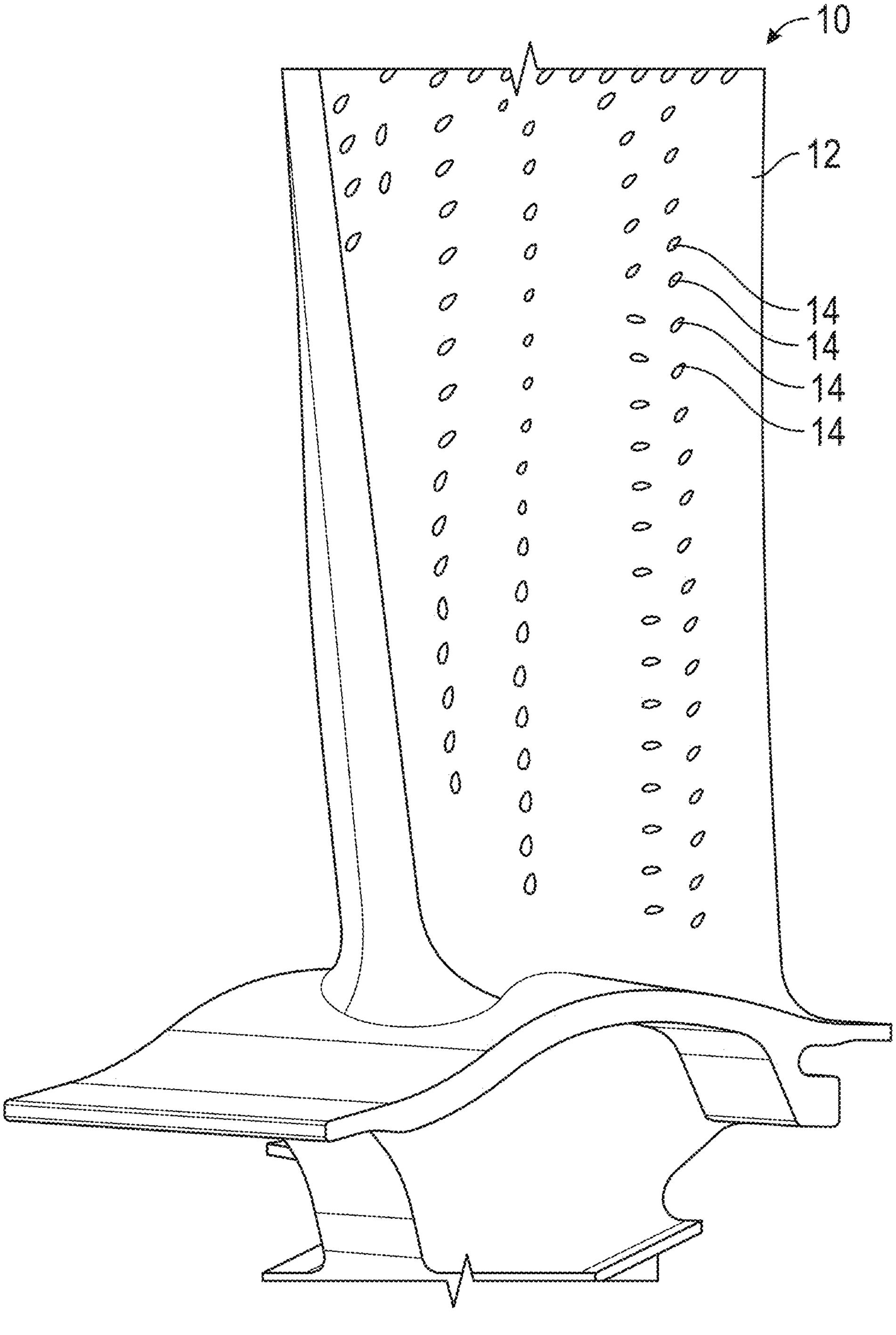
FIG. 1 shows an exemplary article compatible with the laser ablation system disclosed herein, according to an embodiment.

Turning now to the figures, FIG. 1 shows an article 10 in the form of a turbine blade. However, article 10 could also be a nozzle, vane, diffuser, shroud or any other suitable gas turbine part. The contoured exterior surface 12 of the article 10 has numerous holes 14 in the form of cooling holes. The holes 14 may vary in size and/or orientation based on the location on the exterior surface 12. During both manufacturing and refurbishing of the article 10, the article is typically coated with a surface coating and any clogged or partially clogged holes 14 must be cleared of this surface coating to ensure proper functionality of the article 10 and cooling channels therein. A variety of surface coatings and/or substrates may be added to the exterior surface 12 that must be removed in order to enable proper functioning of the holes 14 and the associated cooling channels. This disclosure relates generally to a method and system for ablating a series of holes 14 in an article 10.

Figure 2:
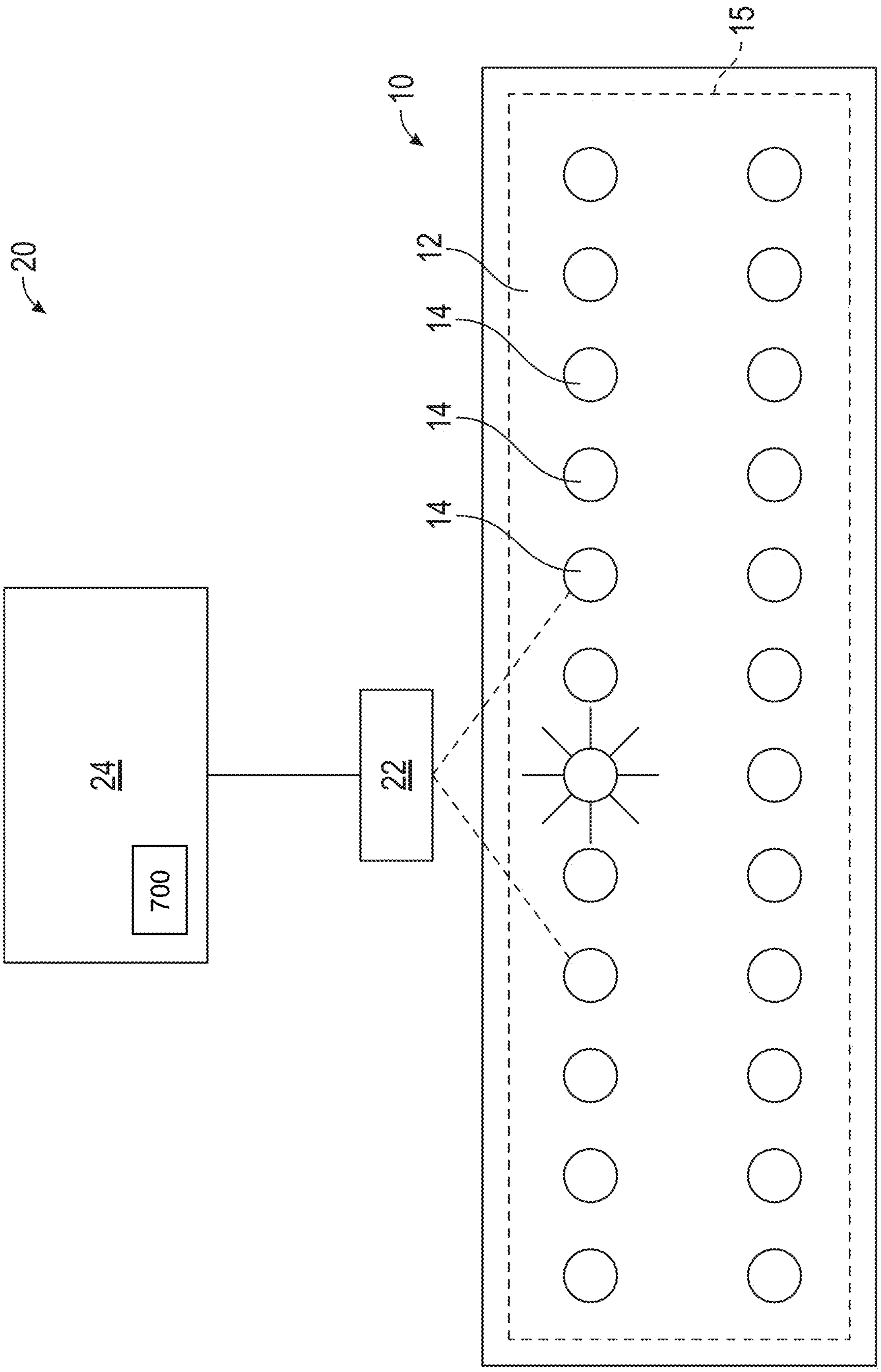
FIG. 2 shows a schematic view of an embodiment of a laser ablation system, according to an embodiment.

Referring to FIG. 2, a laser ablation system is generally designated by reference numeral 20. The laser ablation system 20 includes an ablating device in the form of a laser 22 and a control system 24. The laser 22 may be configured to output laser beam pulses to each hole 14 in a batch of holes of an article 10 without physical translation of the laser. The term "laser" is defined as the laser hardware system and includes the laser beam generator as well as the associated lenses and means for steering the beam. The phrase "laser beam" is the beam emitted by the laser or laser ablation system 20. In other words, the batch of holes are all holes within the field of view of the laser 22. The field of view 15 of the laser is indicated by the dashed rectangle in FIG. 2. The steering mechanism (e.g., a Galvano scanner) in laser 22 enables the laser beam to reach each hole within field of view 15 without the need for physical translation of either the laser or the article. The laser ablation system 20 may contain a single laser 22 that is capable of emitting laser beam pulses at a variety of angles relative to the article 10 without physical translation of laser 22. The control system 24 establishes a laser ablation characteristic including a laser operating parameter, and/or an ablation pattern for each batch of holes and ablates the holes within the batch of holes based on the laser characteristic. In some embodiments, such as those discussed with reference to the method 600 below, the control system 24 establishes a laser characteristic, a working zone characteristic, a cooling hole characteristic, and/or a synchronized machine motion characteristic and ablates the holes based on the established laser ablation characteristic. In other words, the control system 24 uses the established laser ablation characteristic to determine the hole 14 (or batch of holes) to ablate (i.e., clear of debris/obstructions) and how to ablate the hole 14 (e.g., what angle to aim the laser pulse, the amplitude/frequency of the laser pulse, the laser power, the specific pattern of ablated holes, etc.). The control system 24 considers both material properties of the article 10 itself and may incorporate outside knowledge, including but not limited to, knowledge learned from previous applications of the laser ablation system 20 on the same or similar articles. Ultimately, the control system 24 uses the established ablation characteristic to minimize damage to the article 10. Damage to the article 10 occurs in various forms, including but not limited to, spallation of the coating, pitting or other physical damage to the substrate.

Figure 3:
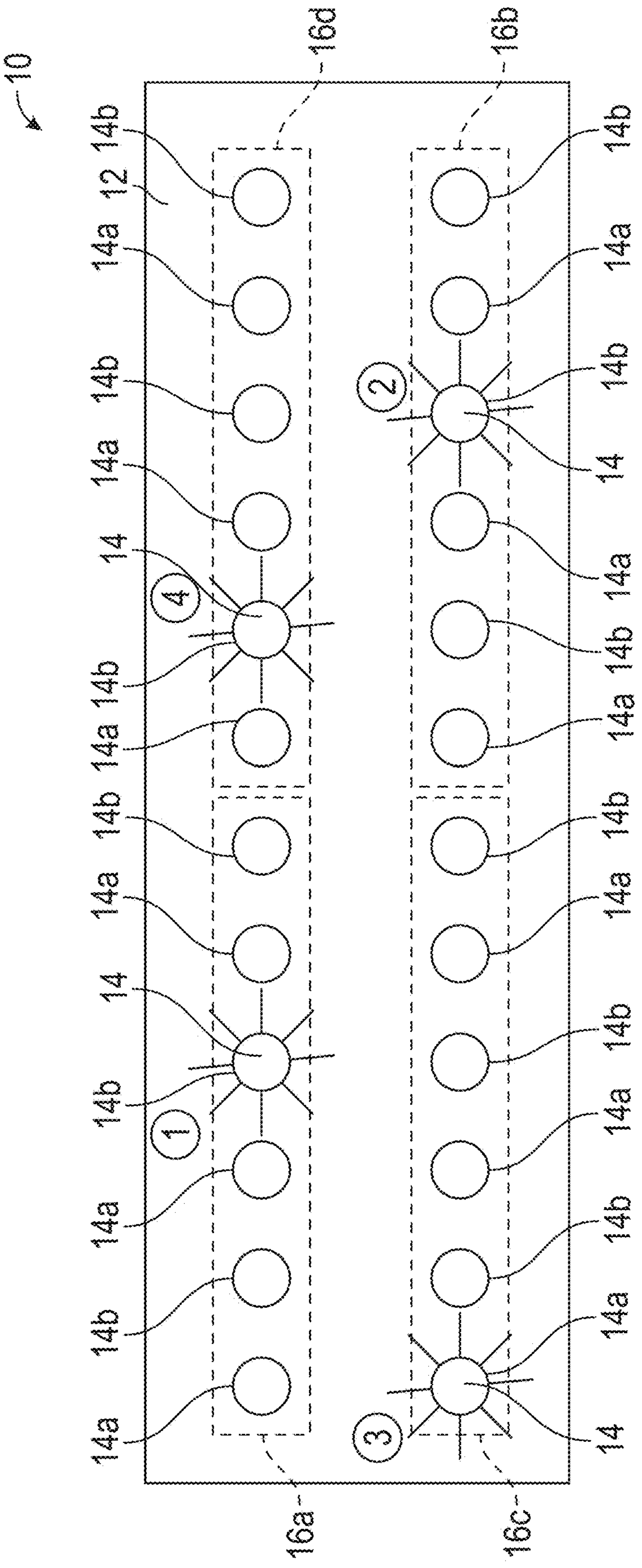
FIG. 3 shows an article compatible with the laser ablation system and method disclosed herein and an ablation pattern of the method of laser ablation, according to an embodiment.

Referring to FIG. 3, in one embodiment the control system 24 identifies four (4) specific batches (16*a*, 16*b*, 16*c*, 16*d*) of six (6) holes each. In the embodiment depicted in FIG. 3 and according to a first ablation pattern, the first batch of holes 16*a* are the top left six holes 14, the second batch of holes 16*b* are the bottom right six holes 14, the third batch of holes 16*c* are the bottom left holes 14, and the fourth batch of holes 16*d* are the top right holes 14. In some embodiments the control system 24 is configured to change the ablation characteristic and ablate the individual cooling holes 14 in each batch of holes based on a changed ablation characteristic. In some embodiments, the control system 24 is configured to ablate the successive batches of holes 14 according to the same ablation characteristic and may change the ablation characteristic and ablate all batches of holes 14 again.

Figure 4:
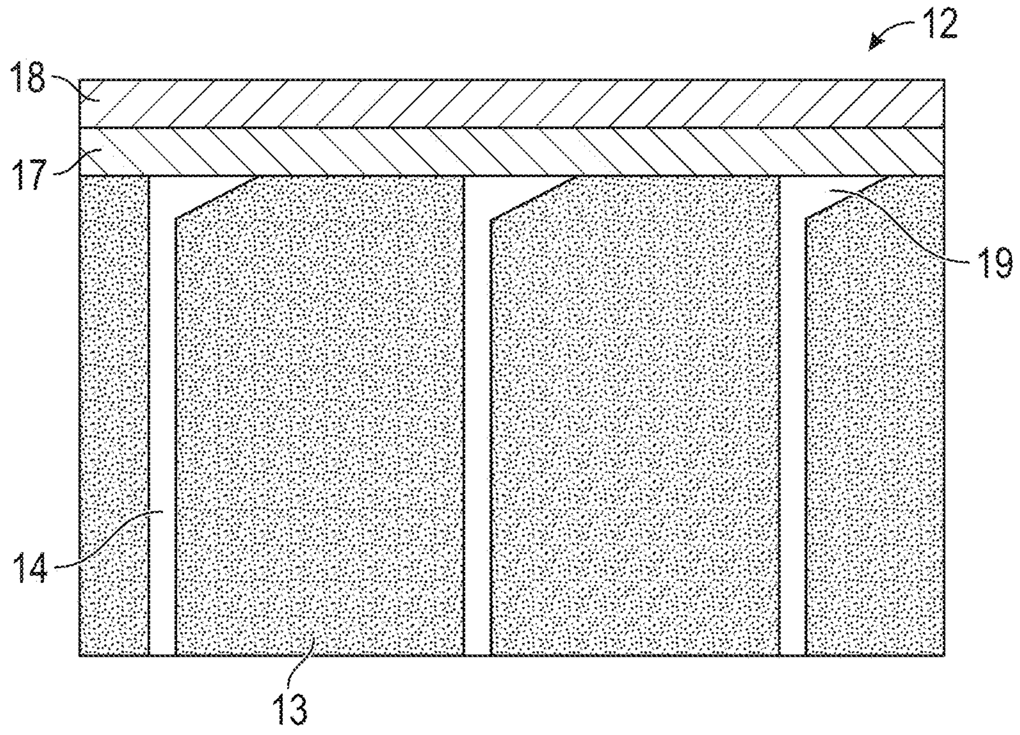
FIG. 4 shows an article having a plurality of cooling holes and a top coat and a bond coat after a recoating process, according to an embodiment.

FIG. 4 illustrates a portion of article 12 having cooling holes 14 located therein. Article 12 is comprised of substrate 13 having cooling holes 14. Cooling holes 14 may also include diffuser sections 19. After the article has been coated or recoated, a bond coat 17 and top coat 18 may obstruct holes 14 and diffuser sections 19. As one example only, bond coat 17 may be a MCrAlY alloy, and top coat may be a yttria stabilized zirconia (YSZ) ceramic. Together, bond coat 17 and top coat 18 form a thermal barrier coating (TBC). To permit proper functioning of the article, the holes 14 and diffuser section 19 must be cleared of all debris and obstructions in the form of any leftover or excess coatings.

Referring back to FIG. 3, a first ablation pattern may be used to ablate a top coat 18, and a second ablation pattern may be used to ablate a bond coat 17, which is underneath the top coat 18. The second ablation pattern may be different than the first ablation pattern. For example, the second ablation pattern may ablate holes 14*a* in series from left to right in each row, and when all holes 14*a* have been ablated then the laser ablates holes 14*b* in each row. This "skipping" of holes permits the local substrate and hole area to cool prior to the next ablation pass. In this way, unwanted thermal damage to the substrate is minimized. As a further example, the laser power used in the first ablation pattern may be lower so that neighboring holes can be ablated without any negative effects to the substrate 13. The second ablation pattern may use a higher laser power so that each ablated hole must be spaced from the previously ablated hole to permit enough time for cooling to avoid substrate damage.

The laser ablation characteristic may also vary based on a specific region to be ablated. For example, a first laser ablation characteristic may be used to ablate regions of hole 14 (see FIG. 4) and a second laser ablation characteristic may be used to ablate regions over the diffuser section 19. As an example only, a first laser pulse width is used to ablate regions over hole 14, and a second laser pulse width (which is different from the first pulse width) may be used to ablate the diffuser sections 19. The specific laser characteristics are chosen to reduce thermal damage to substrate 13 and nearby coatings 17 and 18.

Figure 5A:
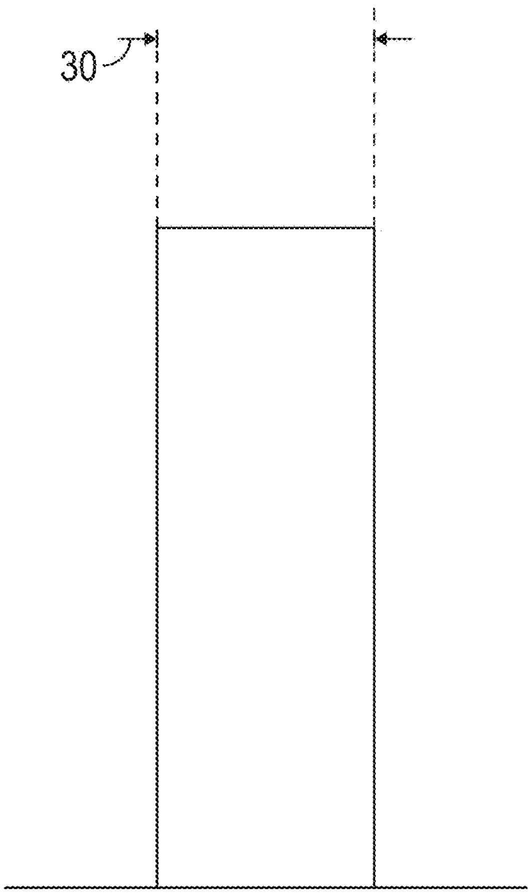
FIG. 5A shows a pulse width of one embodiment of a laser operating parameter of the laser ablation system of FIG. 2, according to an embodiment.
Figure 5B:
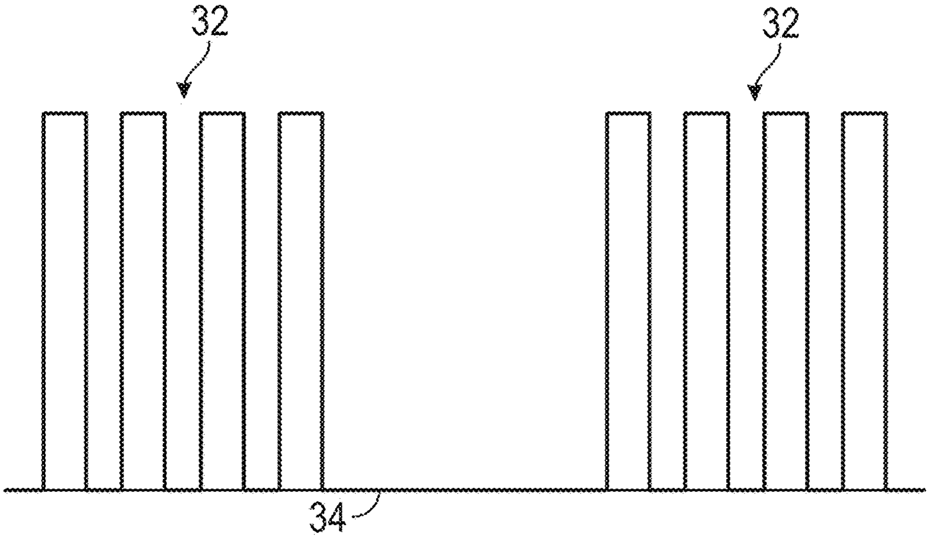
FIG. 5B shows a pulse width of a second embodiment of a laser operating parameter of the laser ablation system of FIG. 2, according to an embodiment.

Referring to FIGS. 5A and 5B, the laser characteristic includes laser operating parameters such as a laser pulse width 30 (or pulse duration), a laser frequency, laser pulse peak power, wavelength, average laser power, laser beam quality, repetition rate, pulse energy, output peak power, laser spot size, energy density, and focal distance. In some embodiments, example laser operating parameters may be one or more of: average laser power between about 25 W and about 250 W, laser beam quality ($M^2$) less than 3, or between 1 and 3, or between 1 and 2, repetition rate of from about 10 kHz to about 10 MHz, laser spot size between about 0.05 mm to about 0.5 mm, pulse width/length of less than about 15 picoseconds. The laser spot size is defined as the smallest diameter of the laser beam at the focal plane. The control system 24 can control the laser ablation characteristic to maximize removal of excess material from the article 10 while protecting the remaining material and substrate 13. The laser 22 is configured to deliver short laser pulse widths 30 of high peak power in an ON configuration 32 and the step of ablating a first working zone and a second working zone minimizes a time in which the laser is in an OFF configuration 34. The term “short” is defined as laser pulses being in a range of femtoseconds, or picoseconds. Minimizing the time in which the laser 22 is in an OFF configuration 34 significantly improves throughput of articles 10 and provides for faster and more efficient debris/obstruction removal.

In some embodiments, the control system 24 establishes a cooling hole characteristic that is configured to evaluate a material thermal capability of an article 10 to minimize damage to the article 10. The cooling hole characteristic includes a dimension of a hole 14, a thermal response of a material of the article 10, an overall three-dimensional shape of a desired cooling hole 14, a ceramic fill, a metallic fill, and/or thermal characteristics of a cooling hole including finished, partially ablated, and fully coated holes. The control system 24 may also evaluate the material properties of any surface coatings and/or substrates added to the exterior surface 12 of the article 10 to also minimize damage caused by the laser 22. One example of the control system 24 changing a characteristic to prevent damage to the article 10 is when the ablation pattern dictates ablating a first hole 14 in the batch of holes to a thermal threshold and then ablating a second hole 14 in the batch of holes while the first hole 14 cools. In some embodiments, specific holes 14 from each batch are targeted in order to efficiently remove material from multiple different batches at once, minimizing the thermal impact on the article 10. In other words, referring to FIG. 3 specifically, in one embodiment, the control system 24 ablates the holes using multiple (and different) ablation patterns. For example, a first ablation pattern may ablate successive neighboring holes in batch **16*a*, then skip rows to second batch 16*b*, and so on. A second ablation pattern may be used after the first ablation pattern is complete, and the second ablation pattern may ablate every other hole, or skip two, three or four holes between hole ablations to minimize negative thermal effects to the substrate 13**.

Figure 6:
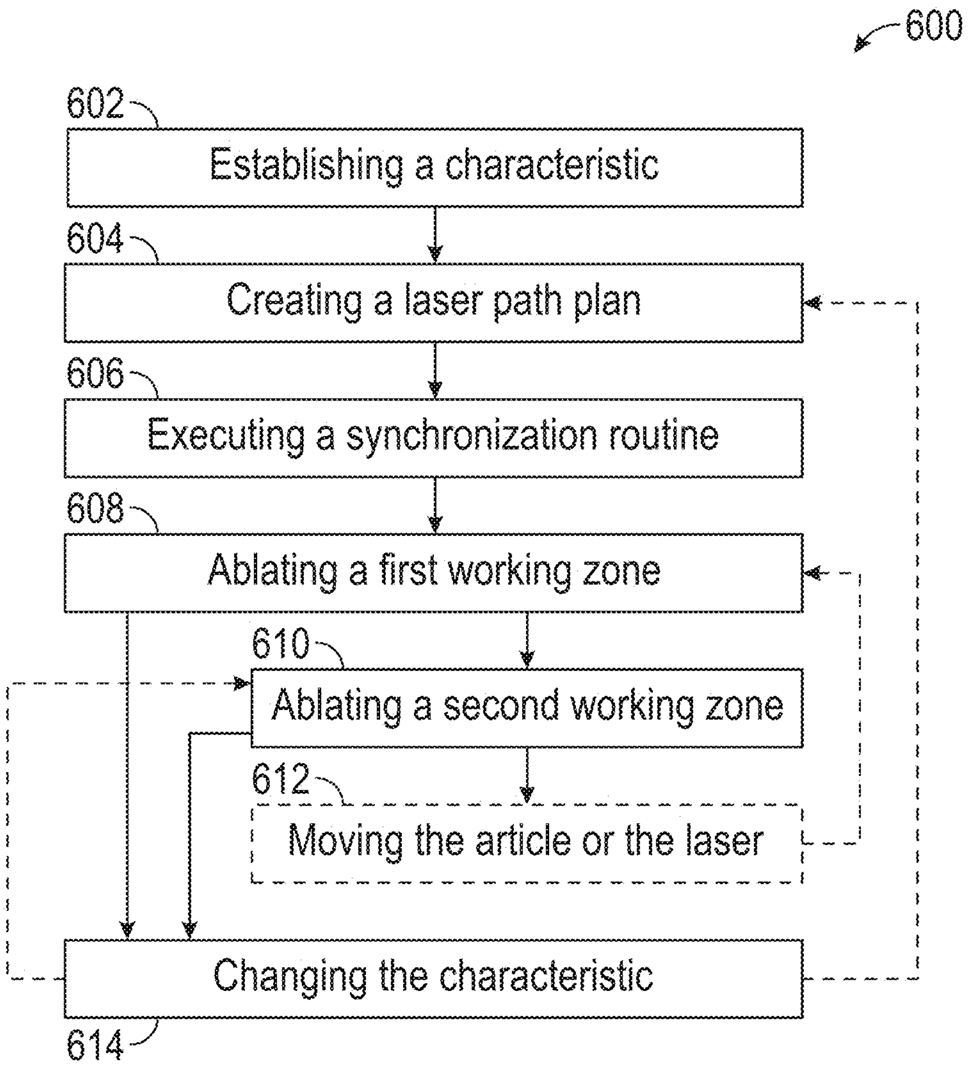
FIG. 6 shows a flow diagram of a method of laser ablation for clearing one or more holes in an article, such as the exemplary apparatus shown in FIG. 2, according to an embodiment.

An exemplary embodiment of a method 600 of laser ablation for restoration of a series of holes 14 in an article 10 is illustrated in the flow diagram in FIG. 6. With reference to FIGS. 1-5, the method 600 includes: establishing 602 a laser characteristic, a working zone characteristic, a cooling hole characteristic, and/or a synchronized machine motion characteristic; creating 604 a laser path plan (e.g., an ablation pattern) for a laser based on the established characteristic for a first working zone and a second working zone of the article 10; executing 606 a synchronization routine to control a location of a laser beam emitted from laser 22 and/or a location of the article 10 relative to one another; and ablating 608 the first working zone and/or ablating 610 a second working zone. The steps of ablating 608, 610 the first working zone and the second working zone may be a continuous operation. In other words, the laser 22 is pulsing at a continuous frequency but is acting on at least two work zones in a consecutive manner. The first working zone and the second working zone may each be within a single hole 14, may be two separate holes 14, may be a hole 14 and its associated diffuser 19, or they may each comprise an entire batch of holes 14, or be a batch of holes in different rows or columns, as set forth above. Performing the ablation in a continuous manner eliminates start and stop motions within the assembly, which are times in which the parts of the assembly accumulate the most wear.

The method 600 includes an optional step of moving 612 the article 10 and/or laser 22 from an initial position to a following position, and vice versa, and repeating the steps of ablating 608, 610 and moving 612 the article 10. In some embodiments, the method includes moving the laser 22 and/or the article 10 during the step of ablating 608, 610 the at least one work zone. The established ablation characteristic can be changed 614 by the control system 24, as set forth above, and the method 600 creates 604 the laser path plan according to the changed ablation characteristic without requiring movement of the laser 22. For example, in step 604, a first ablation pattern may be used, and the method proceeds through steps 606-610, 614, and then a second ablation pattern (different from the first ablation pattern) is selected in step 614 and the second ablation pattern is then used in steps 604-610, or only in step 610. The laser ablation characteristic may also be changed between steps 608 and 610, so that a first laser ablation characteristic is used when ablating a first working zone, and a different, second laser ablation characteristic is used to ablate a second working zone.

The laser path plan is a function of the laser characteristic, the working zone characteristic, the cooling hole characteristic, and the synchronized machine motion characteristic for the article 10 for the first working zone and at least one second working zone. The laser path plan accommodates a number of following working zones and a number of following positions. The laser path plan may evaluate the capabilities of the laser 22 to determine an appropriate or efficient time scale for operation of the laser 22.

The method 600 synchronizes the motion of the laser and/or the article 10 relative to one another by considering characteristics including, but not limited to, linear and rotational acceleration of the laser 22 and/or the article 10, linear and rotational speed of the laser 22 and/or the article 10, repeatability and accuracy, and any additional characteristics relevant for a working zone and an effective working zone (e.g., laser inputs, field of view, a minimum and/or a maximum working distance, a minimum and/or a maximum effective working distance, spot size variation, energy efficiency, etc.). The synchronized machine motion characteristic includes, but is not limited to, motion and laser data in the form of a global and local position synchronization of the laser 22 and/or the article 10, an acceleration and/or deceleration notification, and includes control system latency versus motion of the article and/or laser. The method 600 allows for a dynamic relationship between the laser 22 and the article 10 to efficiently remove debris or obstructions from holes 14 and/or diffuser sections 19. The synchronized machine motion characteristic allows for tracking and monitoring of the location of the laser 22 and the article 10 without the need for registration holes or other zeroing of the device. However, incorporating of registration holes or zeroing the laser 22 during and/or after completion of the method 600 does not depart from the invention disclosed herein.

In some embodiments, the step of creating 604 a laser path plan targets ablation of a cooling hole 14 in a low thermal conductivity zone in a manner so as to enable ablation in a non-optimal working zone by reducing thermally induced damage to the substrate. The step of creating 604 a laser path plan may target ablation where an extremity of the cooling hole is irregular to smooth the transition into and out of the cooling hole. In some embodiments, the laser path plan targets known data regions and difficult ablation zones and layers while the regions, zones, and/or layers are in a peak effective ablation zone for the laser delivery system 20. In some embodiments, the step of creating a laser path plan establishes laser paths that are optimized for a working zone that moves across the article 10 while the article 10 is in motion. The laser path plan may also consider the debris cloud created when the laser 22 is ablating each hole 14 and may minimize or otherwise control the debris cloud to decrease or eliminate damage to the article 10.

The laser path plan is capable of operating in a time scale less than the time in which plasma forms to generate an ablation efficiency. This ablation efficiency can be evaluated and maintained above and/or below an ablation threshold. In some embodiments, the laser path plan operates in a time scale in a femtosecond or picosecond time regime. Here, the femtosecond time regime is defined as between 1 femtosecond and 1,000 femtoseconds. The picosecond time regime is defined as between 1 picosecond and 1,000 picoseconds. The nanosecond time regime is defined as between 1 nanosecond and 1,000 nanoseconds. The microsecond time regime is defined as between 1 microsecond and 1,000 microseconds.

Figure 7:
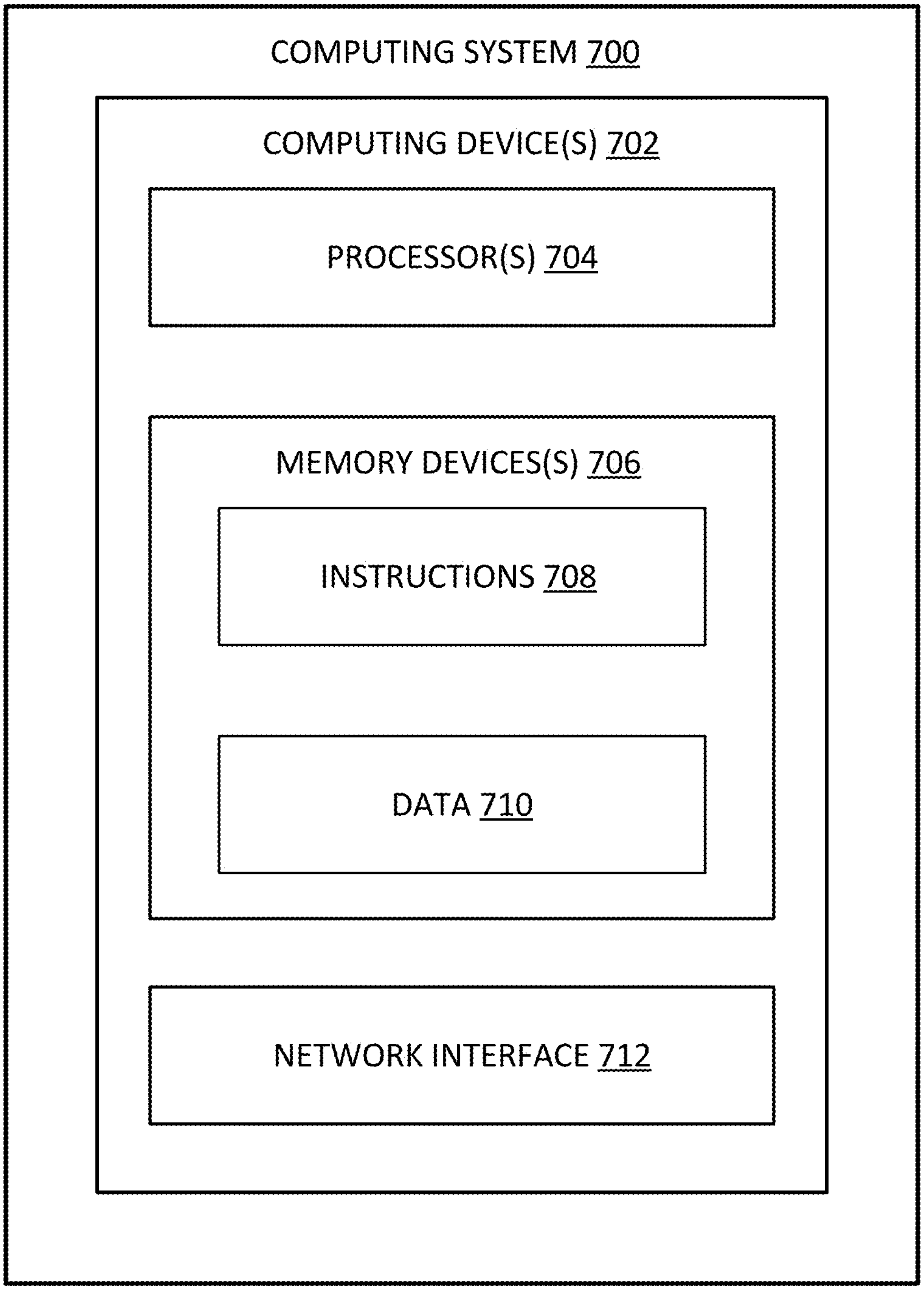
FIG. 7 shows an example computing system, according to an embodiment.

FIG. 7 provides an example computing system 700 in accordance with an exemplary embodiment of control system 24. The computing system 700 described herein can include various components and perform various functions with the one or more computing devices 702 of the computing system 700 described below in association with control system 24 of laser 22.

As shown in FIG. 7, the computing system 700 can include one or more computing device(s) 702. The computing device(s) 702 can include one or more processor(s) 704 and one or more memory device(s) 706. The one or more processor(s) 704 can include any suitable processing device, such as a microprocessor, microcontroller, integrated circuit, logic device, and/or other suitable processing device. The one or more memory device(s) 706 can include one or more computer-readable media, including, but not limited to, non-transitory computer-readable media, RAM, ROM, hard drives, flash drives, and/or other memory devices.

The one or more memory device(s) 706 can store information accessible by the one or more processor(s) 704, including computer-readable instructions 708 that can be executed by the one or more processor(s) 704. The instructions 708 can be any set of instructions that when executed by the one or more processor(s) 704, cause the one or more processor(s) 704 to perform operations, such as any of the operations described herein. For instance, the methods provided herein can be implemented in whole or in part by the computing system 700. The instructions 708 can be software written in any suitable programming language or can be implemented in hardware. Additionally, and/or alternatively, the instructions 708 can be executed in logically and/or virtually separate threads on processor(s) 704. The memory device(s) 706 can further store data 710 that can be accessed by the processor(s) 704. For example, the data 710 can include models, databases, machine motion synchronization data, etc.

The computing device(s) 702 can also include a network (or communication) interface 712 used to communicate, for example, with the other components of the laser system 20 (e.g., via a network). The network interface 712 can include any suitable components for interfacing with one or more network(s), including for example, transmitters, receivers, ports, antennas, and/or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Figure 8:
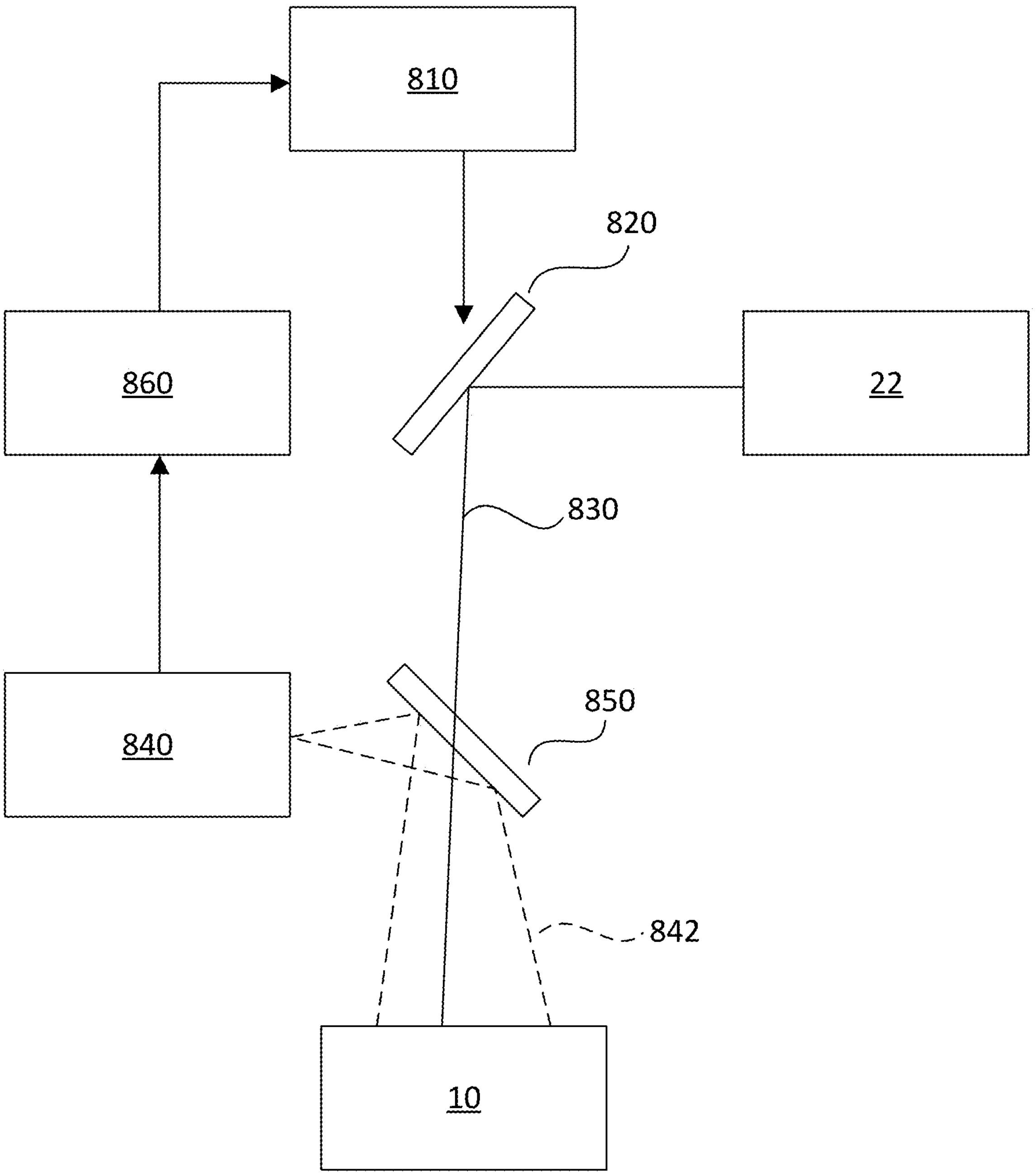
FIG. 8 shows an example laser ablation system, according to an embodiment.

FIG. 8 illustrates a system 800 used to synchronize machine motion, according to an embodiment. The article 10 to be ablated is irradiated by laser 22. A Galvano scanner mirror 820 moves the laser beam 830 in a desired pattern or to a desired location on article 10. The Galvano scanner mirror is controlled by scanner controller 810. Laser 22 may include beam shaping optics like collimator lenses and diffusers that receive an on/off signal from computing system 700. Camera 840 detects an image of article 10 within field of view 842 via beamsplitter 850. This camera acquires the image with an interline sensor, a CCD- or CMOS-chip that allows independent image acquisition and image transfer. However, other camera types could be used as well, such as standard video or high-speed cameras. The start of the image acquisition is controlled by a synchronization control routine in computing system 700. After image acquisition the image is then transferred to the tracking system 860, which determines a target working zone on article 10. The scanner controller 810 is then supplied with the measured coordinates (x/y/z) that are transformed into angles for the scanner mirror 820 to move in order to direct the ablation laser beam 830 onto the intended position on the article 10. After receiving a synchronization signal from the synchronization control routine the laser applies the ablation laser pulse to the article 10. The timing relation of image acquisition, image processing, laser position control and laser firing is controlled by the synchronization control routine in computing system 700 to obtain a synchronized machine motion characteristic. The tracking system 860 tracks the field of view and target group of holes during processing, even if the article 10 moves during the ablation process. For example, article 10 may be moved or rotated during ablation so that the ablation process proceeds uninterrupted for all the desired holes or working zones on article 10. Alternatively, the laser 22 may be moved during the ablation process, or both the laser and article may be moved during the ablation process, and the tracking system ensures the laser is always targeted at the correct hole for ablation.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. For example, parts, components, steps and aspects from different embodiments may be combined or suitable for use in other embodiments even though not described in the disclosure or depicted in the figures. Therefore, since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below. For example, references to “one embodiment” of the present invention are not intended to be interpreted as excluding the existence of additional embodiments that also incorporate the recited features.

In the appended claims, the terms “including” and “in which” are used as the plain-English equivalents of the respective terms “comprising” and “wherein.” Moreover, in the following claims, terms such as “first,” “second,” “third,” “upper,” “lower,” “bottom,” “top,” etc. are used merely as labels, and are not intended to impose numerical or positional requirements on their objects. The terms “substantially,” “generally,” and “about” indicate conditions within reasonably achievable manufacturing and assembly tolerances, relative to ideal desired conditions suitable for achieving the functional purpose of a component or assembly. Further, the limitations of the following claims are not written in means-plus-function format and are not intended to be interpreted as such, unless and until such claim limitations expressly use the phrase “means for” followed by a statement of function void of further structure.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms “includes,” “has,” “possesses,” and the like are used in the detailed description, claims, appendices and drawings, such terms are intended to be inclusive in a manner similar to the term “comprising” as “comprising” is interpreted when employed as a transitional word in a claim. That is, unless explicitly stated to the contrary, embodiments “comprising,” “including,” or “having” an element or a plurality of elements having a particular property may include additional such elements not having that property. Moreover, articles “a” and “an” as used in the subject specification and annexed drawings should generally be construed to mean “one or more” unless specified otherwise or clear from context to be directed to a singular form.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

A method of ablating one or more holes in an article with a laser is provided. The method comprises an establishing step that establishes an ablation characteristic. The ablation characteristic includes a synchronized machine motion characteristic. An ablating step ablates the one or more holes with the laser based on the synchronized machine motion characteristic. The synchronized machine motion characteristic synchronizes a laser beam emitted from the laser with a location of the one or more holes.

The method of the previous clause, wherein the ablating step further comprises moving at least one of the article and the laser during the ablating step.

The method of any previous clause, wherein the ablating step further comprises moving the article during the ablating step.

The method of any previous clause, wherein the ablating step further comprises moving the laser during the ablating step.

The method of any previous clause, wherein the ablation characteristic also comprises at least one of, laser pulse width or pulse duration, laser frequency, laser pulse peak power, wavelength, average laser power, laser beam quality, repetition rate, pulse energy, laser spot size, and focal distance.

The method of any previous clause, wherein the laser pulse width is in a picosecond range, or within a 1 picosecond to 1,000 picosecond range, or within a 1 picosecond to 15 picosecond range.

The method of any previous clause, wherein laser operating parameters are at least one of, a repetition rate is in a range of 10 KHz to 10 MHz, an average laser power is in a range of 25 W to 250 W.

The method of any previous clause, wherein the synchronized machine motion characteristic includes at least one of a linear and a rotational acceleration, a linear and a rotational speed, and a field of view.

The method of any previous clause, further comprising moving at least one of the laser and the article when transitioning from a first working zone to a second working zone.

A system for ablating one or more holes in an article with a laser, the system comprising, a memory storing a set of machine motion synchronization data; and at least one processor executing instructions that cause the at least one processor to perform a series of steps. An establishing step establishes an ablation characteristic, and the ablation characteristic includes a synchronized machine motion characteristic. An ablating step ablates the one or more holes with the laser based on the synchronized machine motion characteristic. The synchronized machine motion characteristic synchronizes a laser beam emitted from the laser with a location of the one or more holes.

The system of the previous clause, wherein the ablating step further comprises, moving at least one of the article and the laser during the ablating step.

The system of any previous clause, wherein the ablating step further comprises, moving the article during the ablating step, or moving the laser during the ablating step.

The system of any previous clause, wherein the ablation characteristic also comprises at least one of, laser pulse peak power, laser pulse width, laser frequency, average laser power, center wavelength, average output power, pulse energy, output peak power, laser spot size, and focal distance.

The system of any previous clause, wherein laser operating parameters are at least one of, laser pulse width is in a picosecond range, or within a 1 picosecond to 1,000 picosecond range, or within a 1 picosecond to 15 picosecond range, a repetition rate is in a range of 10 kHz to 10 MHZ, average laser power is in a range of 25 W to 250 W.

The system of any previous clause, wherein the synchronized machine motion characteristic includes at least one of a linear and a rotational acceleration, a linear and a rotational speed, and a field of view.

The system of any previous clause, further comprising moving at least one of the laser and the article when transitioning from a first working zone to a second working zone.

A non-transitory, computer-readable medium storing instructions that, when executed by at least one processor, causes the at least one processor to perform a plurality of steps. An establishing step establishes an ablation characteristic, and the ablation characteristic includes a synchronized machine motion characteristic. An ablating step ablates one or more holes with a laser based on the synchronized machine motion characteristic. The synchronized machine motion characteristic synchronizes a laser beam emitted from the laser with a location of the one or more holes.

The non-transitory, computer-readable medium of the previous clause, wherein the ablating step further comprises, moving at least one of the article and the laser during the ablating step.

The non-transitory, computer-readable medium of any previous clause, wherein the ablating step further comprises, moving the article during the ablating step.

The non-transitory, computer-readable medium of any previous clause, wherein the ablating step further comprises, moving the laser during the ablating step.

What is claimed is:

1. A method of ablating one or more holes in an article with a laser, the method comprising:
- establishing an ablation characteristic, the ablation characteristic including a synchronized machine motion characteristic to coordinate emission of laser pulses from the laser with machine motion, wherein the synchronized machine motion characteristic includes one or more of a linear acceleration, a rotational acceleration, a linear speed, a rotational speed and field of view;
- creating a laser path plan based on the established ablation characteristic for a first working zone of the article;
- ablating the one or more holes with the laser based on the synchronized machine motion characteristic according to the laser path plan in the first working zone;
- transitioning from the first working zone to a second working zone of the article;
- establishing a second ablation characteristic including a synchronized machine motion characteristic for the second working zone, the second ablation characteristic being different from the ablation characteristic for the first working zone; and
- ablating the one or more holes in the second working zone based on the second ablation characteristic,
- wherein the synchronized machine motion characteristic synchronizes a laser beam emitted from the laser with a location of the one or more holes during ablation in the first working zone and the second working zone.

2. The method of claim 1, wherein the ablating steps further comprises:
- moving at least one of the article and the laser during the ablating steps.

3. The method of claim 1, wherein the ablating steps further comprises:
- moving the article during the ablating steps.

4. The method of claim 1, wherein the ablating steps further comprises:
- moving the laser during the ablating steps.

5. The method of claim 1, wherein the ablation characteristic also comprises at least one of:
- laser pulse width or pulse duration, laser frequency, laser pulse peak power, wavelength, average laser power, laser beam quality, repetition rate, pulse energy, laser spot size, and focal distance.

6. The method of claim 5, wherein the laser pulse width is in a range of 1 picosecond to 1,000 picoseconds.

7. The method of claim 6, wherein the laser pulse width is in a range of 1 picosecond to 15 picoseconds.

8. The method of claim 1, wherein laser operating parameters of the laser comprise at least one of:
- a repetition rate in a range of 10 kHz to 10 MHz,
- average laser power in a range of 25 W to 250 W.

9. The method of claim 1, further comprising moving at least one of the laser and the article when transitioning from the first working zone to the second working zone.

10. A system for ablating one or more holes in an article with a laser, the system comprising:
- a memory storing a set of machine motion synchronization data; and
- at least one processor executing instructions that cause the at least one processor to:
  - establish an ablation characteristic, the ablation characteristic including a synchronized machine motion characteristic to coordinate emission of laser pulses from the laser with machine motion, wherein the synchronized machine motion characteristic includes one or more of a linear acceleration, a rotational acceleration, a linear speed, a rotational speed and field of view;
  - creating a laser path plan based on the established ablation characteristic for a first working zone of the article;
  - ablating the one or more holes with the laser based on the synchronized machine motion characteristic according to the laser path plan in the first working zone;
  - transitioning from the first working zone to a second working zone of the article;
  - establishing a second ablation characteristic including a synchronized machine motion characteristic for the second working zone, the second ablation characteristic being different from the ablation characteristic for the first working zone; and
  - ablating the one or more holes in the second working zone based on the second ablation characteristic,
  - wherein the synchronized machine motion characteristic synchronizes a laser beam emitted from the laser with a location of the one or more holes during ablation in the first working zone and the second working zone.

11. The system of claim 10, wherein the ablating steps further comprises:

moving at least one of the article and the laser during the ablating steps.

12. The system of claim 10, wherein the ablating steps further comprises:

moving the article during the ablating steps, or moving the laser during the ablating steps.

13. The system of claim 10, wherein the ablation characteristic also comprises at least one of:

laser pulse peak power, laser pulse width, laser frequency, average laser power, center wavelength, average output power, pulse energy, output peak power, laser spot size, and focal distance.

14. The system of claim 13, wherein laser operating parameters of the laser comprise one or more of:

laser pulse width in a range of 1 picosecond to 1,000 picoseconds, a repetition rate in a range of 10 KHz to 10 MHz, and average laser power in a range of 25 W to 250 W.

15. The system of claim 14, wherein the laser pulse width is in a range of 1 picosecond to 15 picoseconds.

16. The system of claim 10, further comprising moving at least one of the laser and the article when transitioning from the first working zone to the second working zone.

17. A non-transitory, computer-readable medium storing instructions that, when executed by at least one processor, causes the at least one processor to:

establish an ablation characteristic, the ablation characteristic including a synchronized machine motion characteristic to coordinate emission of laser pulses from the laser with machine motion, wherein the synchronized machine motion characteristic includes one or more of a linear acceleration, a rotational acceleration, a linear speed, a rotational speed and field of view;

creating a laser path plan based on the established ablation characteristic for a first working zone of the article;

ablating one or more holes with a laser based on the synchronized machine motion characteristic according to the laser path plan in the first working zone;

transitioning from the first working zone to a second working zone of the article;

establishing a second ablation characteristic including a synchronized machine motion characteristic for the second working zone, the second ablation characteristic being different from the ablation characteristic for the first working zone; and ablating the one or more holes in the second working zone based on the second ablation characteristic, wherein the synchronized machine motion characteristic synchronizes a laser beam emitted from the laser with a location of the one or more holes during ablation in the first working zone and the second working zone.

18. The non-transitory, computer-readable medium of claim 17, wherein the ablating steps further comprises:

moving at least one of the article and the laser during the ablating steps.

19. The non-transitory, computer-readable medium of claim 17, wherein the ablating steps further comprises:

moving the article during the ablating steps.

20. The non-transitory, computer-readable medium of claim 17, wherein the ablating steps further comprises:

moving the laser during the ablating steps.

* * * * *